US012466453B2

(12) United States Patent
Young

(10) Patent No.: US 12,466,453 B2
(45) Date of Patent: Nov. 11, 2025

(54) DEVICE AND METHOD FOR RESPONDING TO LOSS-OF-BRAKE ON A RAILROAD CROSSING GATE MECHANISM

(71) Applicant: Siemens Mobility, Inc., New York, NY (US)

(72) Inventor: Paul Young, Louisville, KY (US)

(73) Assignee: Siemens Mobility, Inc., New York, NY (US)

( * ) Notice: Subject to any disclaimer, the term of this patent is extended or adjusted under 35 U.S.C. 154(b) by 729 days.

(21) Appl. No.: 17/815,734

(22) Filed: Jul. 28, 2022

(65) Prior Publication Data

US 2024/0034376 A1 Feb. 1, 2024

(51) Int. Cl.
*B61L 29/10* (2006.01)
*B61L 29/16* (2006.01)
*H02K 11/215* (2016.01)
*B61L 29/22* (2006.01)

(52) U.S. Cl.
CPC ............... *B61L 29/10* (2013.01); *B61L 29/16* (2013.01); *H02K 11/215* (2016.01); *B61L 29/22* (2013.01)

(58) Field of Classification Search
CPC .......... B61L 29/00; B61L 29/02; B61L 29/04; B61L 29/08; B61L 29/10; B61L 29/16; B61L 2201/00; H02K 11/215
USPC .................................... 216/125, 127; 49/139
See application file for complete search history.

(56) References Cited

U.S. PATENT DOCUMENTS

2005/0284987 A1* 12/2005 Kande .................... B61L 29/16 246/125
2007/0130834 A1 6/2007 Kande et al.
2021/0265898 A1* 8/2021 Reed ...................... G01D 5/145
2022/0041195 A1 2/2022 Spencer et al.

FOREIGN PATENT DOCUMENTS

CZ 305310 B6 * 7/2015 .............. B61L 29/16

* cited by examiner

*Primary Examiner* — S. Joseph Morano
*Assistant Examiner* — Heaven R Buffington

(57) ABSTRACT

A crossing gate mechanism includes an electric brushless direct current (BLDC) motor with a sensing device, a crossing gate arm operated via the BLDC motor, a motor brake coupled to the BLDC motor, wherein the motor brake is configured to hold the crossing gate arm in a position, and a controller configured to control the BLDC motor, wherein the controller is configured to control the BLDC motor to raise or lower the crossing gate arm in response to a gate control signal, and wherein, when the motor brake fails to hold the crossing gate arm in the position, the controller is configured to control the BLDC motor to hold the crossing gate arm in the position instead of the motor brake.

18 Claims, 3 Drawing Sheets

DEVICE AND METHOD FOR RESPONDING TO LOSS-OF-BRAKE ON A RAILROAD CROSSING GATE MECHANISM

BACKGROUND

1. Field

Aspects of the present disclosure generally relate to railroad crossing gates and, more particularly, to systems and methods for responding to loss-of-brake on a railroad crossing gate mechanism.

2. Description of the Related Art

Railroad crossing gates, which typically are raised by default and lowered when a train approaches and crosses an intersection of a road and railroad track (i.e., a crossing, also referred to as level crossing), may be provided for roadway and pedestrian safety. In some instances, there may be separate gates for the roadway and the pedestrian path. For public safety reasons, it is essential that these crossing gates operate correctly.

Typically, railroad crossing gates utilize electrical and mechanical components to ensure that the gates perform their intended functions correctly. For example, gate arms are lowered using a motor located in a gate control mechanism. A crossing gate mechanism may be described as a gate control box housing multiple electric and electronic components for operating and controlling the signal control equipment and warning devices, such as the crossing gates. Typically, the gate control box includes a housing with a cover or door, so that the control box may be opened for maintenance or other services. The same mechanism uses or is connected to counterweights to counterbalance the gate arms during movement of the arms.

Existing gate control mechanisms may control a gate arm using a stepper motor and resistively snub the arm down to a counterweighted resting position. Stepper motor action is much more abrupt, less smooth, and results in significant wear on components over time. Further, holding an arm in place requires application of a brake, which also results in additional wear on the brake. For example, when a gate arm reaches a near-vertical gate-up position, the brake is applied to hold the arm in place. If the brake fails to hold the gate arm in place, then the arm is resistively snubbed down to a gate-down position, which may prevent normal flow of traffic if there is no train, and the gate arm should therefore be up. To return normal functionality to the gate mechanism, the gate mechanism needs to be serviced to repair the brake. Thus, an improved gate control mechanism is desirable.

SUMMARY

Briefly described, one or more embodiments of the present disclosure provide for a gate crossing mechanism, including techniques for controlling a gate crossing motor and determining or detecting characteristics, such as position, direction of motion, of a crossing gate arm associated with the gate crossing motor. An implementation of the described crossing gate mechanism and associated methods includes a field-programmable gate array, which is selected for its real-time responsiveness and ability to handle multiple activities at once.

A first aspect of the present disclosure provides a crossing gate mechanism comprising an electric brushless direct current (BLDC) motor with at least one sensing device, a crossing gate arm operated via the BLDC motor, a motor brake coupled to the BLDC motor, wherein the motor brake is configured to hold the crossing gate arm in a position, and a controller configured to control the BLDC motor, wherein the controller is configured to control the BLDC motor to raise or lower the crossing gate arm in response to a gate control signal, and wherein, when the motor brake fails to hold the crossing gate arm in the position, the controller is configured to control the BLDC motor to hold the crossing gate arm in the position instead of the motor brake.

A second aspect of the present disclosure provides a method for responding to loss-of-brake on a railroad crossing gate mechanism, the method comprising raising, by a brushless direct current (BLDC) motor in combination with a controller, a crossing gate arm in a desired position, engaging a motor brake for holding the crossing gate arm in the desired position, detecting that the motor brake has failed, and engaging the BLDC motor to hold the crossing gate arm in the desired position instead of the motor brake.

DETAILED DESCRIPTION

Figure 1:
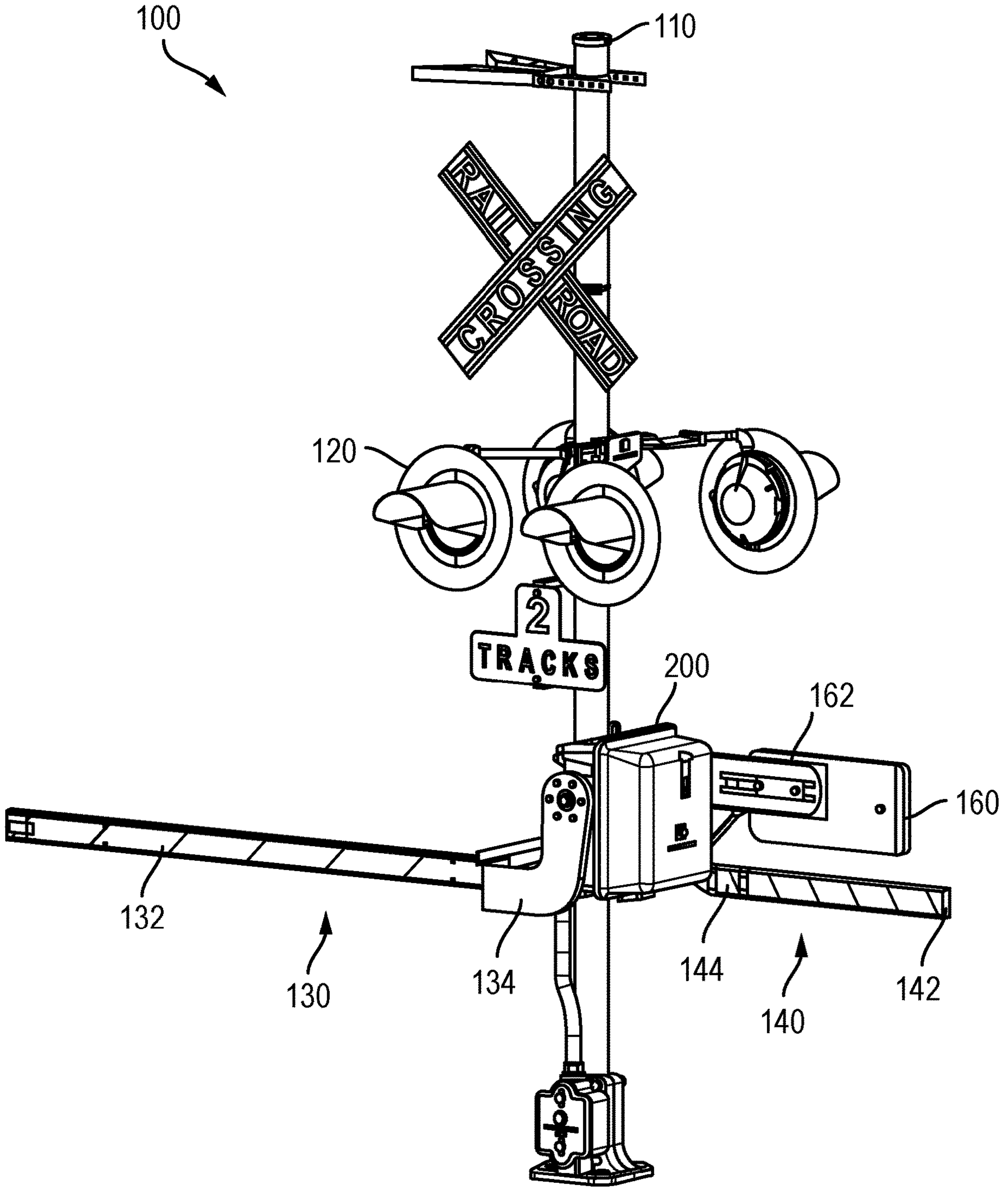
FIG. 1 illustrates an example railroad crossing gate in accordance with an exemplary embodiment of the present disclosure.

To facilitate an understanding of embodiments, principles, and features of the present disclosure, they are explained hereinafter with reference to implementation in illustrative embodiments. In particular, they are described in the context of methods and systems for detecting and controlling a gate arm position of a railroad crossing gate mechanism.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

A gate crossing mechanism protects motorists, pedestrians, and the like from oncoming trains by blocking level crossings or points at which public or private roads cross railway lines at the same level. As one example, a gate crossing mechanism can include an arm or "gate" that, using a motor, selectively lowers/raises depending upon whether a train or other vehicle is passing through the level crossing. For example, if a train is approaching a level crossing, a gate can be lowered to prevent traffic on the road or path from crossing the railway line. A level crossing can be equipped with multiple gate crossing mechanisms. For example, each side of the railway line can include a gate crossing mechanism. In larger intersections, each side of the railway line can include two (or more) gate crossing mechanisms. Gate crossing mechanisms can further include lights, sirens, bells, or other similar devices that can provide visual and/or aural warnings.

Conventional gate crossing mechanisms can be susceptible to failures, malfunctions, etc., which can reduce their reliability to control a level crossing safely. It is, therefore, desirable to improve efficiency and reliability of conventional gate crossing mechanisms.

Gate crossing mechanisms having the features and functionality described herein improve efficiency and address problems associated with conventional gate crossing mechanisms. For example, a gate crossing mechanism can include a brushless electric motor and digital control logic rather than a conventional brushed motor and mechanical cams. Motor brushes can experience uneven wear patterns, after which they must be replaced. This is both costly and time consuming for railways or those responsible for maintaining gate crossing mechanisms featuring brushed motors.

Additionally, brushless motors of the gate crossing mechanisms described herein provide expanded fault detection such as overcurrent detection, which can be determined from measured three-phase motor currents. This active fault detection serves to increase the availability of the gate crossing mechanism. The brushless motors of the gate crossing mechanisms described herein also provide an improved user interface to give maintainers clear feedback on gate configuration. This improves efficiency and accuracy for maintainers to set gate attributes in the field, thereby decreasing human error. Finally, the brushless motors of the gate crossing mechanisms described herein support a configurable gate that can function as either an entrance or an exit gate, which can depend for example on field-programmable gate array (FPGA) firmware. This is a stark difference from the conventional gate crossing mechanisms, which can only function as an entrance gate unless an additional circuit card is attached.

FIG. 1 illustrates a railroad crossing gate 100 in a lowered or horizontal position. At many railroad crossings, at least one railroad crossing gate 100 may be placed on either side of the railroad track to restrict roadway traffic in both directions. At some crossings, pedestrian paths or sidewalks may run parallel to the roadway. To restrict road and sidewalk traffic, the illustrated railroad crossing gate 100 includes a separate roadway gate 130 and pedestrian gate 140. The roadway gate 130 and pedestrian gate 140 may be raised and lowered, i. e. operated, by gate control mechanism 200.

The example railroad crossing gate 100 also includes a pole 110 and signal lights 120. The gate control mechanism 200 is attached to the pole 110 and is used to raise and lower the roadway and pedestrian gates 130, 140. The illustrated railroad crossing gate 100 is often referred to as a combined crossing gate. When a train approaches the crossing, the railroad crossing gate 100 may provide a visual warning using the signal lights 120. The gate control mechanism 200 will lower the roadway gate 130 and the pedestrian gate 140 to respectively restrict traffic and pedestrians from crossing the track until the train has passed.

As shown in FIG. 1, the roadway gate 130 comprises a roadway gate support arm 134 that attaches a roadway gate arm 132 to the gate control mechanism 200. Similarly, the pedestrian gate 140 comprises a pedestrian gate support arm 144 connecting a pedestrian gate arm 142 to the gate control mechanism 200. When raised, the gates 130 and 140 are positioned so that they do not interfere with either roadway or pedestrian traffic. This position is often referred to as the vertical position. A counterweight 160 is connected to a counterweight support arm 162 connected to the gate control mechanism 200 to counterbalance the roadway gate arm 132. Although not shown, a long counterweight support arm could be provided in place of the short counterweight support arm 134.

Typically, the gates 130, 140 are lowered from the vertical position using an electric motor contained within the gate control mechanism 200. The electric motor drives gearing connected to shafts (not shown) connected to the roadway gate support arm 134 and pedestrian gate support arm 144. The support arms 134, 144 are usually driven part of the way down by the motor (e.g., somewhere between 70 and 45 degrees) and then gravity and momentum are allowed to bring the arms 132, 142 and the support arms 134, 144 to the horizontal position. In another example, the support arms 134, 144 are driven all the way down to the horizontal position by the electric motor of the gate control mechanism 200.

Figure 2:
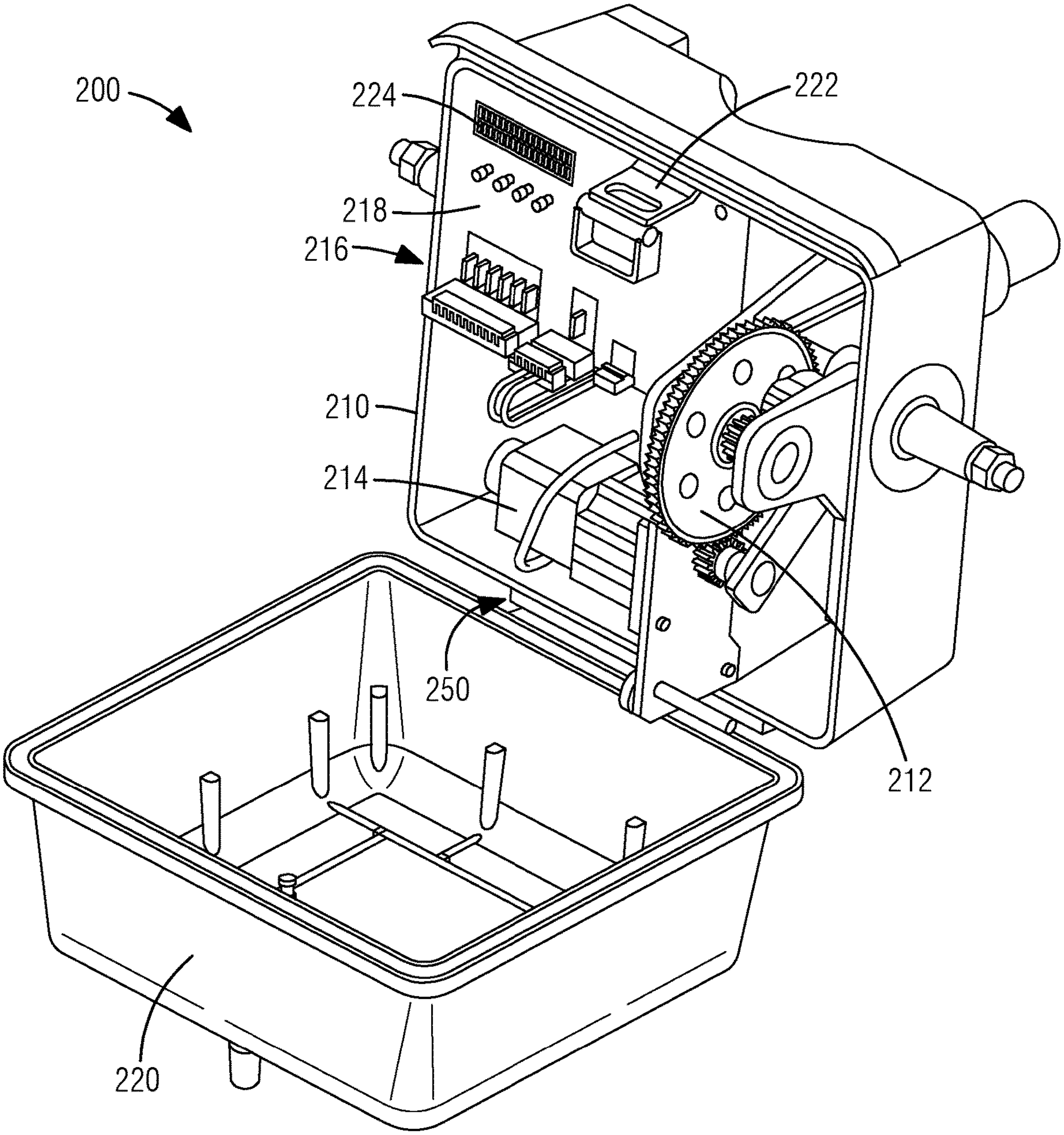
FIG. 2 illustrates a perspective view of a crossing gate mechanism in accordance with an exemplary embodiment of the present disclosure.

FIG. 2 illustrates a perspective view of crossing gate mechanism 200 in accordance with an exemplary embodiment of the present disclosure.

The crossing gate mechanism 200 comprises an enclosure 210 housing multiple electric and electronic components, such as for example gearing 212, electric motor 214 driving the gearing 212, and control unit 216. The control unit 216 comprises a printed circuit board (PCB) 218 with the necessary electronics for operating and controlling the gate mechanism 200 and associated crossing gate equipment, such as crossing gate arm(s), see for example FIG. 1. Further, the PCB 218 comprises for example display(s) and/or light emitting diodes (LEDs) 224, used for example to indicate or display status of the gate mechanism 200, such status including for example 'Power on', 'Gate Control', 'Brake On', 'Health' etc.

The enclosure 210 can be opened and closed via door or cover 220, for maintenance, repair, or other services. The cover 220 is moveable between a closed position and an open position, wherein FIG. 2 shows the cover 220 in the open position. The cover 220 is closed via hinge 250 and latch plate 222 in connection with a latch rod (not shown).

Figure 3:
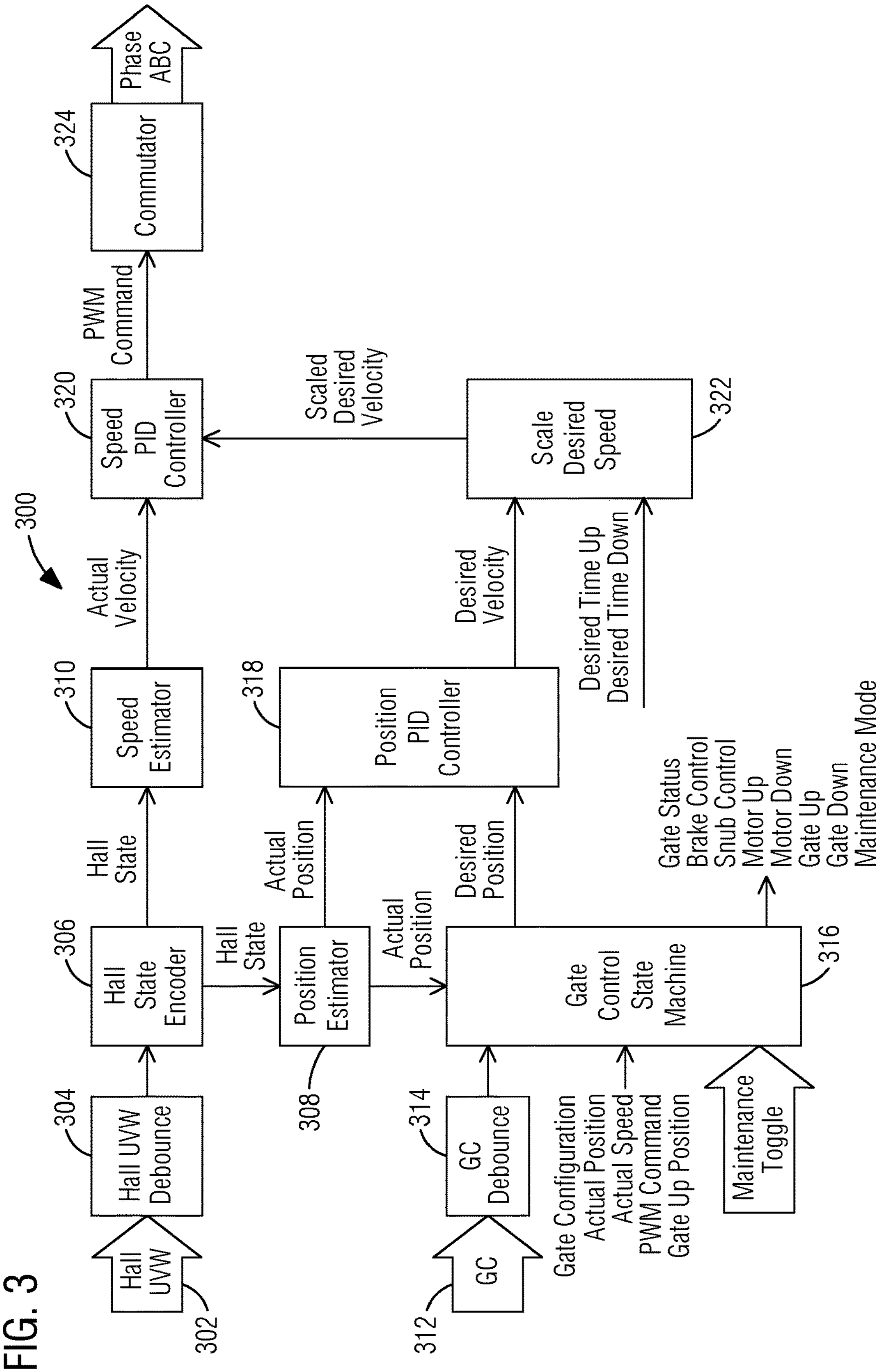
FIG. 3 illustrates a block diagram of a controller firmware design, including flow chart, in accordance with an exemplary embodiment of the present disclosure.

FIG. 3 illustrates a block diagram of a motor controller firmware design, including flow chart, in accordance with an exemplary embodiment of the present disclosure.

In accordance with an exemplary embodiment of the present disclosure, a motor controller 300, is utilized for controlling an electric motor inside the gate mechanism to raise or lower a crossing gate arm in response to gate control signals received from a grade crossing controller or constant warning time device arranged wayside adjacent to a railroad track, for example in a crossing bungalow. For example, with reference to FIG. 1 and FIG. 2, the controller 300 can be utilized within control unit 216 of gate mechanism 200 for controlling electric motor 214 to raise or lower gate arms 132, 142.

In an example, the motor controller, or simply controller 300, comprises (or is designed or implemented) as a field-programmable gate array (FPGA). In other examples, the controller 300 is designed or implemented in a real-time central processing unit (CPU), an application-specific integrated circuit (ASIC), a complex programmable logic device (CPLD) or a system-on-chip (SoC). In case of a SoC, the SoC comprises a CPU and an FPGA.

Specifically, the electric motor controlled and/or operated by the controller 300 is an electric brushless direct current motor, herein referred to as BLDC motor, with at least one sensing device. The at least one sensing device comprises one or more Hall effect sensor(s). For example, the electric BLDC motor can be a 10-pole BLDC motor with three (3) Hall effect sensors.

With reference to FIG. 3, Hall UVW 302 are Hall effect sensor input signals received from the BLDC motor, specifically the Hall effect sensors installed in the BLDC motor.

The Hall UVW 302 sensor input signals are debounced, by Hall UVW Debounce 304, to minimize extraneous edge detections. A debounce time can be for example 25 milliseconds.

A Hall State Encoder 306 determines a current Hall state as well as a motor direction of the BLDC motor. In an example, the Hall effect sensor input signals are received as a sequence represented by vector <U V W>, where U is the most significant bit and W is the least significant bit. The sequence(s) is encoded into Hall states. When Hall states are received in a first order, the Hall State Encoder 306 indicates that the BLDC motor is turning in a forward direction, which for Position Estimator 308 results in an actual position of the gate arm, measured in Hall-state units, counting upward. When Hall states are received in a second order, then the Hall State Encoder 306 indicates that the BLDC motor is turning in a reverse direction, which for the Position Estimator 308 results in the actual position of the gate arm, measured in Hall-state units, counting downward.

Further, the Hall states are also used by a commutation block, see Commutator 324, to determine a correct firing sequence for motor phases A, B and C of the BLDC motor.

As noted, the Position Estimator 308 determines the actual position of the gate arm by counting the number of Hall states that have been received from the Hall State Encoder 306. A Hall state received in a forward direction, results in the actual position being incremented by one; a Hall state received in a reverse direction, results in the actual position being decremented by one. Forward and reverse directions are determined by the Hall State Encoder 306. When the gate arm is moving up, the actual position is counting up in a forward direction; when the gate arm is moving down, the actual position is counting down in a reverse direction. For an entrance gate, each time the arm reaches the bottom, unless an obstruction has been encountered, the actual position is reset to avoid accumulating any positional error.

An actual speed generated by Speed Estimator 310 is a count of the number of Hall states that have been sent by the Hall Sate Encoder 306 during a sampling window in a given direction, multiplied by a scaling factor that converts the count to motor revolutions per second (RPS).

Gate Control, referred to as GC 312, comprises and provides gate control input signals, received from a grade crossing controller, constant warning time device or other type of control equipment arranged wayside adjacent to a railroad track, for example in a crossing bungalow. When GC 312 is high, the gate arm is being commanded to go up until it has reached a programmed, near-vertical gate-up position. When GC 312 is low, the gate arm is being commanded to go down until it has reached a fixed, horizontal gate-down position.

The input signal from GC 312 is debounced, by GC Debounce 314, to minimize extraneous edge detections. A debounce time can be for example 25 microseconds.

Gate Control State Machine 316 receives a debounced GC input signal to determine a proper motion of the gate arm. The Gate Control State Machine 316 determines or decides whether the gate arm needs to move up, move down or stop moving to achieve a desired position for the gate arm. The Gate Control State Machine 316 also manages states of multiple outputs, including motor brake and motor snub circuit.

A Position PID (proportional-integral-derivative) Controller 318 compares the actual position, provided by Position Estimator 308, to the desired position, provided by the Gate Control State Machine 316, of the gate arm and outputs a desired speed/velocity. A scaling factor can also be applied to the desired speed to slow down or speed up the arm movement.

A Speed PID (proportional-integral-derivative) Controller 320 compares the actual speed to the desired speed of the gate arm and outputs a PWM (pulse width modulation) command. In an example, the Position PID Controller 318 uses a PID control loop to meet a desired position by outputting a desired velocity to the Speed PID Controller 320.

A Scale Desired Speed logic 322 multiplies the desired speed/velocity by an ascent or descent speed scale factor, depending on whether the gate arm is moving up or moving down, respectively. The ascent or descent speed scale factors are initialized by a processor of the gate control mechanism and automatically adjusted within a constrained range to better meet the desired up time or desired down time, as programmed by the processor into the controller 300.

The Speed PID Controller 320 uses for example a PID control loop to meet a scaled desired velocity by outputting a PWM command to the Commutator 324. The PWM command from the Speed PID Controller 320 is converted into a motor direction and PWM duty cycle, which the Commutator 324 uses, along with the encoded Hall state, to activate half-bridge field effect transistor(s) (FETs) that deliver current to a sequence of motor winding phases, such as phases A, B, C. To cause the BLDC motor to spin, the three motor winding phases A, B and C are energized by the Commutator 324 in a rotating sequence. The Hall state(s) from the Hall State Encoder 306 indicate(s) the current motor position, based on which corresponding windings are energized. The Commutator 324 can further be configured to provide reverse commutation to spin the BLDC motor in an opposite direction, thus causing the gate arm to move both up and down.

In an embodiment, a method for driving or operating the BLDC motor is a complementary pulse width modulation (PWM) using six independently controlled FETs (a high and low FET for each motor phase). As each phase A, B, C is being driven the high and low side FETs will be driven inversely, with a guaranteed "dead time" where neither the high FET nor the low FET is driven.

In an application and embodiment, the controller 300 and an associated method can be implemented for responding to a loss-of-brake on the railroad crossing gate arm.

As noted earlier, holding the crossing gate arm in place requires application of a brake, specifically a motor brake coupled to the BLDC motor. The controller 300 is configured to activate the motor brake. For example, the controller 300 engages high-side and low-side drivers to active the motor brake, wherein the Gate Control State Machine 316 directs the application of the motor brake by sending the required control signals to activate the motor-brake circuit.

For example, when the gate arm reaches a near-vertical gate-up position, the brake is applied to hold the arm in place. In a typical application if the brake fails to hold the gate arm in place, then the arm is resistively snubbed down to a gate-down position, which may prevent normal flow of traffic if there is no train, and the gate arm should therefore be up.

To respond to such a brake failure immediately and without delay, caused for example by servicing the gate and motor brake, the crossing gate mechanism is adapted such that when the motor brake fails, the controller 300 is configured to control the BLDC motor to hold the crossing gate arm in the position. This means that the BLDC motor is engaged and holds the crossing gate arm in place instead of the (failed) motor brake.

If the motor brake fails and the crossing gate arm begins to fall from its desired position, typically the near-vertical gate-up position, the Gate Control State Machine 316 is configured to attempt to move the arm back to its desired position and re-engage the brake. If the brake continues to fail, then an error code is generated by the Gate Control State Machine 316.

In an example, the motor brake may have multiple chances to hold the crossing gate arm. After those multiple chances to hold, the brake is deemed to have failed.

Because the controller 300 includes the Position PID Controller 318 and the Speed PID Controller 320, and the desired position and desired speed of the gate arm are under PID control, the BLDC motor can be engaged and controlled to hold the gate arm in place in case the motor brake has failed. For example, the desired position is selected such that the crossing gate arm is held in the position, e. g. near-vertical gate-up position, after detecting or determining that the brake has failed. The Gate Control State Machine 316 is configured, e. g. programmed, such that, after determining a failure of the motor brake, to provide the desired position to the Position PID Controller 318. The Position PID Controller 318 is configured to compare the desired position to an actual position of the crossing gate arm and provide a desired speed, wherein the Speed PID controller 320 is configured to compare the desired speed to an actual speed of the crossing gate arm and provide a drive-strength command to the BLDC motor. The crossing gate is moved back to the desired position, e. g. near-vertical gate-up position and held in place by the BLDC motor.

Further, a method for responding to a loss-of-brake on a railroad crossing gate mechanism in accordance with embodiments of the present disclosure is described. For example, the method may be performed utilizing a crossing gate mechanism with a controller 300, configured for example as a field-programmable gate array, as described with reference to FIG. 3.

Generally, the method comprises raising, by a brushless direct current (BLDC) motor in combination with controller 300, a crossing gate arm in a desired position, engaging a motor brake for holding the crossing gate arm in the desired position, detecting that the motor brake has failed, and engaging the BLDC motor to hold the crossing gate arm in the desired position instead of the motor brake. Before engaging the BLDC motor to hold the crossing gate arm in place, the motor brake can be re-engaged, for example multiple times, to hold the crossing gate arm.

In an embodiment, the method further comprises moving, by the BLDC motor, the crossing gate arm back to the desired position when the motor brake has failed, and the position of the crossing gate arm has changed. The method may further include generating an error code in response to a failed motor brake. In an example, the error code is generated by the Gate Control State Machine 316.

In another embodiment, the method further comprises providing, by the Gate Control State Machine 316, the desired position of the crossing gate arm to a PID (proportional-integral-derivative) controller 318, and comparing, by the PID controller 318, the desired position to an actual position of the crossing gate arm and outputting a desired speed. Further, the desired speed is compared, by the PID controller 320, the desired speed to an actual speed of the crossing gate arm and providing a drive-strength command to the BLDC motor.

While the method is described as a series of acts or steps that are performed in a sequence, it is to be understood that the method may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The described gate control mechanism with controller firmware 300 and associated method allow the gate mechanism to retain normal functionality even though the brake has failed. Because the position and speed of the gate arm are under PID control, the gate motor can be engaged to hold the gate arm in place instead of the (failed) brake.

Further, utilizing the described gate control mechanism with controller firmware 300, a crossing gate arm is controlled and operated smoothly by a brushless DC motor. The position of the gate arm is tracked accurately by tracking Hall effect sensor signal sequences. The speed of the gate arm can be controlled to meet time targets when sweeping the gate arm from gate-up to gate-down and vice versa. Further, the gate arm can respond to up, down and reversal commands smoothly which reduces wear on mechanical components. Furthermore, the gate arm can be held still in one position for the following conditions: when in maintenance mode, when vandals are attempting to lift the gate arm, or when the arm has been damaged by a vehicle and the arm counterweights must be held in place. By controlling the gate arm smoothly, component wear is significantly reduced, which results in a significantly reduced maintenance schedule. In addition, features such as arm retention, which prevents a vandal from lifting an arm, can be added.

The invention claimed is:

1. A crossing gate mechanism comprising:
an electric brushless direct current (BLDC) motor with at least one sensing device,
a crossing gate arm operated via the BLDC motor,
a motor brake coupled to the BLDC motor, wherein the motor brake is configured to hold the crossing gate arm in a position, and
a controller configured to control the BLDC motor,
wherein the controller is configured to control the BLDC motor to raise or lower the crossing gate arm in response to a gate control signal,
wherein, when the motor brake fails to hold the crossing gate arm in the position, the controller is configured to control the BLDC motor to hold the crossing gate arm in the position instead of the motor brake, and
wherein the controller includes a PID (proportional-integral-derivative) controller for a desired position and a desired speed of the crossing gate arm, and wherein the desired position is selected such that the crossing gate arm is held in the position.

2. The crossing gate mechanism of claim 1,
wherein the controller is configured to re-engage the motor brake to hold the crossing gate arm before engaging the BLDC motor to hold the crossing gate arm.

3. The crossing gate mechanism of claim 1,
wherein, when the motor brake fails and the position of the crossing gate arm has changed, the controller is configured to control the BLDC motor to move the crossing gate arm back to the position.

4. The crossing gate mechanism of claim 1,
wherein the controller is configured to generate an error code in response to a failed motor brake.

5. The crossing gate mechanism of claim 1, wherein the position corresponds to a near-vertical gate-up position of the crossing gate arm.

6. The crossing gate mechanism of claim 1, wherein the controller comprises a gate control state machine configured to provide the desired position of the crossing gate arm to the PID controller, and wherein the position PID controller is configured to compare the desired position to an actual position of the crossing gate arm and provide a desired speed.

7. The crossing gate mechanism of claim 6, wherein the PID controller is configured to compare the desired speed to an actual speed of the crossing gate arm and provide a drive-strength command to the BLDC motor.

8. The crossing gate mechanism of claim 1, wherein the controller is implemented as a field-programmable gate array (FPGA).

9. The crossing gate mechanism of claim 1, wherein the controller is implemented in a real-time central processing unit (CPU), an application-specific integrated circuit (ASIC), a complex programmable logic device (CPLD) or a system-on-chip (SoC).

10. The crossing gate mechanism of claim 1, wherein the at least one sensing device comprises one or more Hall effect sensor(s).

11. The crossing gate mechanism of claim 1, wherein the controller comprises a Hall state encoder configured to determine a direction of an arm motion based on signals from the at least one sensing device, and wherein the controller comprises a position estimator that, together with the Hall state encoder, is configured to track an arm position of the crossing gate arm.

12. A method for responding to loss-of-brake on a railroad crossing gate mechanism, the method comprising:

raising, by a brushless direct current (BLDC) motor in combination with a controller, a crossing gate arm in a desired position, engaging a motor brake for holding the crossing gate arm in the desired position, detecting that the motor brake has failed, engaging the BLDC motor to hold the crossing gate arm in the desired position instead of the motor brake, and providing, by a gate control state machine, the desired position of the crossing gate arm to a PID (proportional-integral-derivative) controller, and comparing, by the PID controller, the desired position to an actual position of the crossing gate arm and outputting a desired speed.

13. The method of claim 12, further comprising:

re-engaging the motor brake to hold the crossing gate arm before engaging the BLDC motor to hold the crossing gate arm.

14. The method of claim 12, further comprising:

moving, by the BLDC motor, the crossing gate arm back to the desired position when the motor brake has failed and the position of the crossing gate arm has changed.

15. The method of claim 12, further comprising:

generating an error code in response to a failed motor brake.

16. The method of claim 12, comprising:

comparing, by the PID controller, the desired speed to an actual speed of the crossing gate arm and providing a drive-strength command to the BLDC motor.

17. The method of claim 12, wherein the desired position corresponds to a near-vertical gate-up position of the crossing gate arm.

18. The method of claim 12, wherein the controller is implemented as a field-programmable gate array (FPGA), a real-time central processing unit (CPU), an application-specific integrated circuit (ASIC), a complex programmable logic device (CPLD) or a system-on-chip (SoC).

* * * * *